Feb. 27, 1934. W. J. KIRKPATRICK 1,948,762
VALVE STEM
Filed April 22, 1930
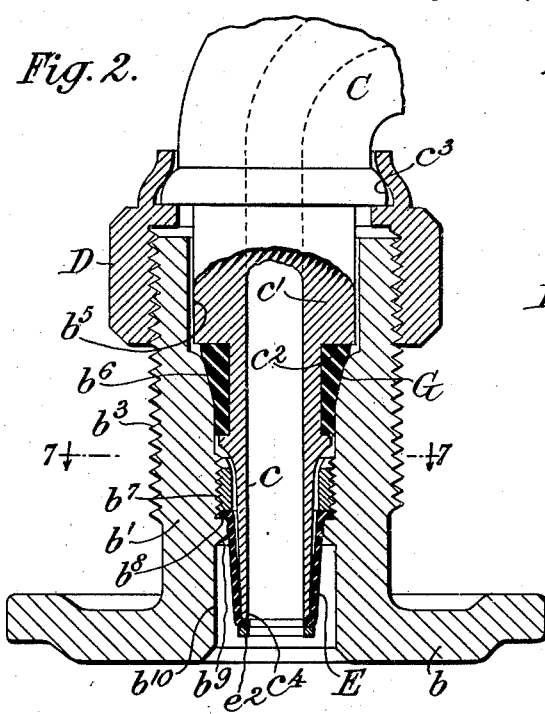
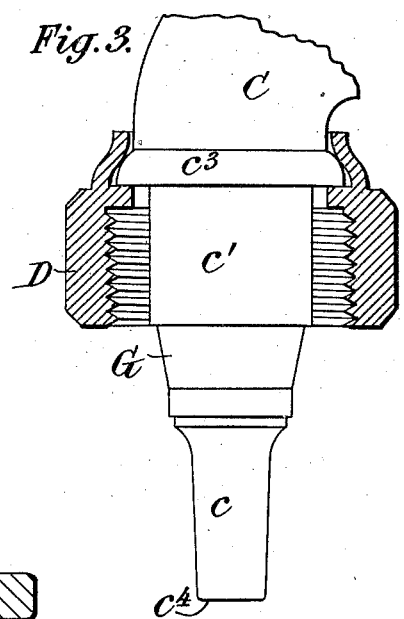
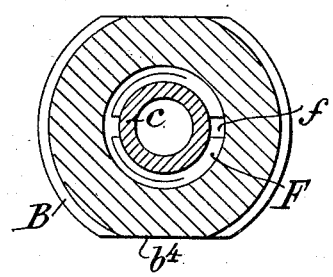
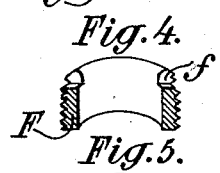
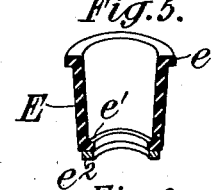
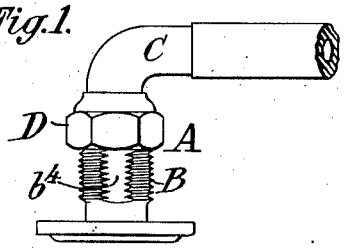
INVENTOR
William J. Kirkpatrick
By Attorneys,
Fraser, Myers & Manley Patented Feb. 27, 1934

1,948,762

UNITED STATES PATENT OFFICE 1,948,762

VALVE STEM

William J. Kirkpatrick, Garden City, N. Y., assignor to A. Schrader's Son, Incorporated, New York, N. Y., a corporation of New York Application April 22, 1930. Serial No. 446,250

4 Claims. (Cl. 285—122)

The present invention relates to valve stems for tire valves or the like, and more particularly to the manner of providing a leak-tight coupling joint between the parts of a divided or two-piece valve stem.

Heretofore pneumatic tubes for tires have been provided with one-piece valve stems, such stems being of different lengths and provided with different angular bends, depending upon the character of wheel upon which the tire was to be mounted. This necessitated the carrying in stock at service stations of a large number of pneumatic tubes so as to include the various types of stems. It has been proposed to equip the inner tubes with a short valve stem part of standard dimensions and to supply to the service station or dealer valve stem extension elements fitted with the valve insides, said extension elements being either straight or bent so that when assembled with the valve stem base in the tube, any desired character of valve stem can be obtained. Although this proposal has not gone into extensive use, various forms of coupling means for providing a leak-tight joint between the two valve stem parts have been proposed but have been found deficient or objectionable for one reason or another.

According to the present invention I provide a novel manner of coupling together valve stem parts so as to provide an efficient leak-tight joint therebetween notwithstanding the considerable vibration which such joints are subjected to when the tire is upon a wheel in motion. The coupling joint is of a character which permits of its quick assembly; one which provides a double seal against posible leakage; one in which the character of the sealing joints are different; one in which a packing element, should it become defective, can be replaced without replacing an entire valve part; and one which can be incorporated in valve stem base parts having present day standard dimensions. The invention also embodies other features of novelty which will be apparent from the detailed description which follows, when considered in conjunction with the accompanying drawing, wherein Figure 1 is a side elevation of a two-piece valve stem, the upper stem element providing a right-angle with the lower or stem base element.

Fig. 2 is a longitudinal section on a greatly enlarged scale of the details of the coupling connection between the valve stem parts, a portion of the upper stem part being shown in elevation.

Fig. 3 is an elevation of the coupling end of the upper valve stem part, the coupling nut carried thereby being shown in diametrical section.

Fig. 4 is a detail of a clamping nut employed for holding one of the packing elements in place within the valve stem.

Fig. 5 is a diametrical longitudinal section of one of the packing elements forming part of the present invention.

Fig. 6 is a bottom plan view of the packing element shown in Fig. 5.

Fig. 7 is a transverse section taken substantially along the plane of the line 7—7 of Fig. 2.

Referring to the drawing, let A indicate a two-piece valve stem consisting of a valve stem base part B, a valve stem top part C and a coupling means D for connecting the parts B and C together. The base part B is provided with a conventional foot portion or flange $b$ adapted to engage against the inner face of a pneumatic tube, a tubular stem portion $b'$ having a bore extending therethrough and provided on its exterior surface with mutilated threads $b^3$ and opposite flat surfaces $b^4$, as is conventional on valve stems. The top part C may have any desired shape and is adapted to be fitted at its outer end (not shown) with a conventional inflating valve or tire valve inside.

According to the present invention the cooperating elements of the parts B and C are of novel construction, and when in assembled relation provide a simple, practicable and efficient joint between the parts.

In the preferred embodiment of my invention as illustrated in the drawing, the bore through the stem $b'$ is of different diameters. At its top it has a bore portion $b^5$ of large diameter, below which there is a tapered seat or shoulder $b^6$, below which in turn the bore is internally threaded, as shown at $b^7$. At the lower end of the threaded portion $b^7$ there is provided a second shoulder or seat $b^8$ provided by an inwardly directed annular rib $b^9$, below which the bore is again enlarged to provide a clearance $b^{10}$. Seated upon the shoulder $b^8$ and extending into the bore $b^{10}$ is a tubular elastic packing E which is formed at one end with an outwardly directed flange $e$, and at its opposite end with an inwardly directed flange $e'$, the latter being reinforced on its under face with a substantially rigid ring $e^2$ of rubber, vulcanite, metal or the like, which may be attached to said flange $e'$ in any approved manner, for example, by being vulcanized thereto. The tubular packing E is removably held within the valve stem part $b'$ by having the flange $e$ clamped against the shoulder $b^8$ by a nut bushing F which screw-threadedly engages the threads $b^7$ within the stem. To manipulate said nut with a spanner wrench or the like, the top surface of the nut is formed with a pair of diametrically disposed detents or recesses $f$.

The valve stem part C is formed at its coupling end with a tubular extension of various diameters, the lower end of said extension $c$ being of a diameter to freely pass through the bushing nut F into the tubular elastic packing E and engage the inner wall thereof and adapted to have its free end seat against the inwardly directed flange $e'$ on said tubular packing. The upper end $c'$ of said tubular extension has a diameter to seat within the enlarged recess $b^5$ in the valve stem part $b'$. Between the parts $c$ and $c'$ of the tubular extension it is formed with an external annular groove $c^2$, within which is provided a compressible packing G which is adapted to seat upon the shoulder $b^6$ and form a leak-tight joint therewith when the tubular extension is inserted into the valve stem part $b'$ and said parts coupled together.

To couple the parts B and C together, the part C at the enlarged end of the tubular extension is provided with an annular rib $c^3$, over which is mounted so as to swivel thereon, the coupling nut D, the internal threads of which are adapted to engage the threads $b^4$ on the part B. The length of the tubular extension on C is such that when the packing G is seated upon the shoulder $b^6$, the tubular extension $c$ will extend into the bore of the part B to a point below the normal position of the flange $e'$ of the tubular packing E. When coupling the parts together therefore, the flange $e'$ will be engaged by the end $c^4$ of the extension $c$ before the packing G engages and seats upon the shoulder $b^6$. The engagement between $c^4$ and $e'$ will cause an elongation or stretching of the tubular elastic packing E as the extension on the part C is progressively moved into part B through movement of the nut D down over the threads $b^4$. A leak-tight seal is thus provided between the parts $c$ and E in advance of the seal being made by the packing G upon the shoulder $b^6$, the first seal becoming progressively more positive owing to the tension to which the tubular member E is being subjected as the packing G is pressed home upon its seat. The tire pressure will also function to cause the inner wall of the tubular packing E to hug the lower portion of extension $c$ to insure the seal between said parts. It will thus be seen that an efficient double seal between the members B and C is provided through this novel coupling arrangement.

While I have shown and described the preferred embodiment of my invention, I do not wish to be limited to the details of construction disclosed, since modifications thereof may be resorted to without departing from the spirit of the invention.

What I claim is:

1. A device of the class described comprising two tubular elements, one having a part to engage within the other, an elastic tubular packing carried by one of said elements and engageable by the other to longitudinally distend the same, said tubular packing being reinforced at one end with a relatively rigid ring, whereby to provide an abutment shoulder for engagement by the other tubular element, and means for coupling said tubular elements together with the packing in distended condition.

2. A device of the class described comprising an entered member and an entering member, means for coupling said members together, and spaced apart packings providing a multiple leak-tight seal between the members, at least one of said packings providing a seal by being subjected to tension by elongation, and at least one of the packings providing a seal by being subjected to compression.

3. A valve stem or the like, comprising a part adapted for connection with a fluid receptacle, a part adapted to receive a valve inside, one of said parts having an enlarged bore to receive a projection on the other part, packings for sealing said parts against leakage at a plurality of spaced apart points, at least one of said packings being extensible to permit limited longitudinal movement of the parts during the coupling of the parts together, and means for coupling said parts together.

4. A device of the class described, comprising a tubular entered member, a tubular entering member and a tubular packing providing sealing means between said members, said packing being supported at one end by one of the members, and unsupported below said end whereat it is formed with an inwardly extending flange, said unsupported end being adapted to engage the end and hug the lateral wall of the other member, and means for coupling said members together with their respective parts in leak-tight engagement with the tubular packing.

WILLIAM J. KIRKPATRICK.